United States Patent [19]

Nakanishi et al.

[11] 4,318,422
[45] Mar. 9, 1982

[54] BUTTERFLY VALVE

[75] Inventors: Mikimaro Nakanishi, Yao; Kiyoji Tanimoto, Katano, both of Japan

[73] Assignee: Tomoe Technical Research Company, Higashi-Osaka, Japan

[21] Appl. No.: 100,637

[22] Filed: Dec. 5, 1979

[30] Foreign Application Priority Data

Dec. 19, 1978 [JP] Japan .................... 53-173187[U]

[51] Int. Cl.³ ................ F16K 1/226; F16K 1/36
[52] U.S. Cl. ................ 137/246; 137/246.16; 137/246.22; 251/306; 251/355
[58] Field of Search ............ 251/305, 306, 355; 137/246–246.22

[56] References Cited

U.S. PATENT DOCUMENTS

| 2,070,000 | 2/1937 | Clade | 137/246.17 |
| 2,147,851 | 2/1939 | Mallon | 137/246.22 |
| 2,169,810 | 8/1939 | Mueller | 137/246.22 |
| 3,183,925 | 5/1965 | Hoyle et al. | 137/246.22 |
| 3,346,002 | 10/1967 | Thompson, Jr. et al. | 137/246.22 |
| 3,580,268 | 5/1971 | Shafer | 137/246.22 |
| 3,589,678 | 6/1971 | Magoon | 251/306 |
| 4,014,511 | 3/1977 | Uno | 251/306 |
| 4,025,050 | 5/1977 | Manki et al. | 251/306 |
| 4,140,147 | 2/1979 | Van't Sant | 251/306 |

FOREIGN PATENT DOCUMENTS

| 2648520 | 5/1978 | Fed. Rep. of Germany . |
| 2650644 | 5/1978 | Fed. Rep. of Germany . |
| 2733606 | 2/1979 | Fed. Rep. of Germany | 251/306 |
| 2915440 | 10/1979 | Fed. Rep. of Germany | 137/246 |

Primary Examiner—H. Jay Spiegel

[57] ABSTRACT

A butterfly valve is adapted to pivot a valve stem to a valve body through openings formed in a ring-shaped elastic valve seat attached inside the valve body, to slidably contact the valve member and the inner face of the valve seat each other in the vicinity of the valve stem, and to form recesses for charging lubricant in the slidably contacting face on the valve seat or on the side face of the valve member.

21 Claims, 9 Drawing Figures

BUTTERFLY VALVE

The present invention relates to a butterfly valve adapted to open and close the passage of the fluid flow by rotating a disk-shaped valve member of metal within a valve seat of rubber provided on the inner circumferential surface of a valve body.

A butterfly valve which has the valve body covered with ring-shaped valve seat of elastic material such as rubber and the like in all or almost all inner surface thereof has been very commonly used conventionally. This kind of valve commonly has an elastic valve seat inside the annular face of the valve body and has a valve stem, which is fixed to a disk-shaped valve member assembled inside the valve seat, supported through an opening formed in a diametically opposed location of the valve seat.

In such a butterfly valve, a flat face is formed around the circumference of the valve member in the vicinity of the valve stem, and corresponding to it, another flat face is formed around said opening inside said valve seat, and by said flat faces both on the valve member and on the valve seat an annular contacting face is formed with desirable width in the radial direction to actuate for sealing in rotation between the valve stem and the valve member and for closing the valve by pressing most part of the circumference of the valve member on the valve seat.

Herein, pressing and turning action is affected during operation of the valve between the valve member of rigid material and the valve seat of elastic material in the relatively close vicinity of the valve stem in the circumference of the valve member. From the fact that both of said flat faces are always acting force each other, said flat face of the valve seat weaker in strength of material than the valve member wears in a shorter time than other parts resulting in ready deterioration of sealing function. It is not too much to say that the period for exchanging the valve seat depends on the durability of said flat parts.

Although with the intention of keeping the sealing condition between both of these flat faces satisfactory as long as possible a measure, for example, to apply silicon oil to these portions have been proposed, this portion of the valve seat, being held under pressure between the valve body and the valve member of rigid material, is liable to be twisted in rotating the valve member with effect of eliminating oil from applied portion, in addition to removing oil due to fluid flow, resulting in rapid consumption of oil, which makes the effect of increase in durability not so expectable unless especially favorable.

Further, a measure adapted to make a ring of material having lubricating property and high strength such as, for example, teflon (Trade Mark) to adhere to the flat portion of the valve seat has been already proposed. However, in spite of superiority in its property itself, it is inevitable that such a measure becomes uneconomical, moreover, due to increased rate of off-grade by failure of teflon-lining.

It is an object of the present invention, in the light of defects proper to such a well-known central type of a butterfly valve, to provide a type of a butterfly valve which enables to increase in the durability much more than the well-known type, in addition to economical production without fundamental modification to configuration of conventional butterfly valve.

The present invention is to provide a butterfly valve in which the valve stem is pivoted to the valve body through an opening in a ring-shaped elastic valve seat fitted to the inner face of the valve body and the valve member and the inner face of the valve seat are adapted to slidably contact in the vicinity around said valve stem, wherein at least one of recesses for charging lubricant is formed on said slidably contacting face on at least one between the face of the valve seat and the side face of the valve member.

So according to the present invention, the recess for charging lubricant formed in the flat zone always contacting under pressure between the valve seat and the valve member enables durability of the valve to increase remarkably. By experiment, it has been confirmed that the side face of the valve seat does not wear at all even after opening-shutting test more than 50,000 times, whereas in case of conventional contacting faces applied with silicon oil it was difficult to open and shut the valve member smoothly more than 20,000 times under perfect dry condition.

Now a preferable embodiment of the present invention is described with accompanying drawings, by which said objects and features of the present invention and further other objects and features will be understood more distinctly;

Figure 1:
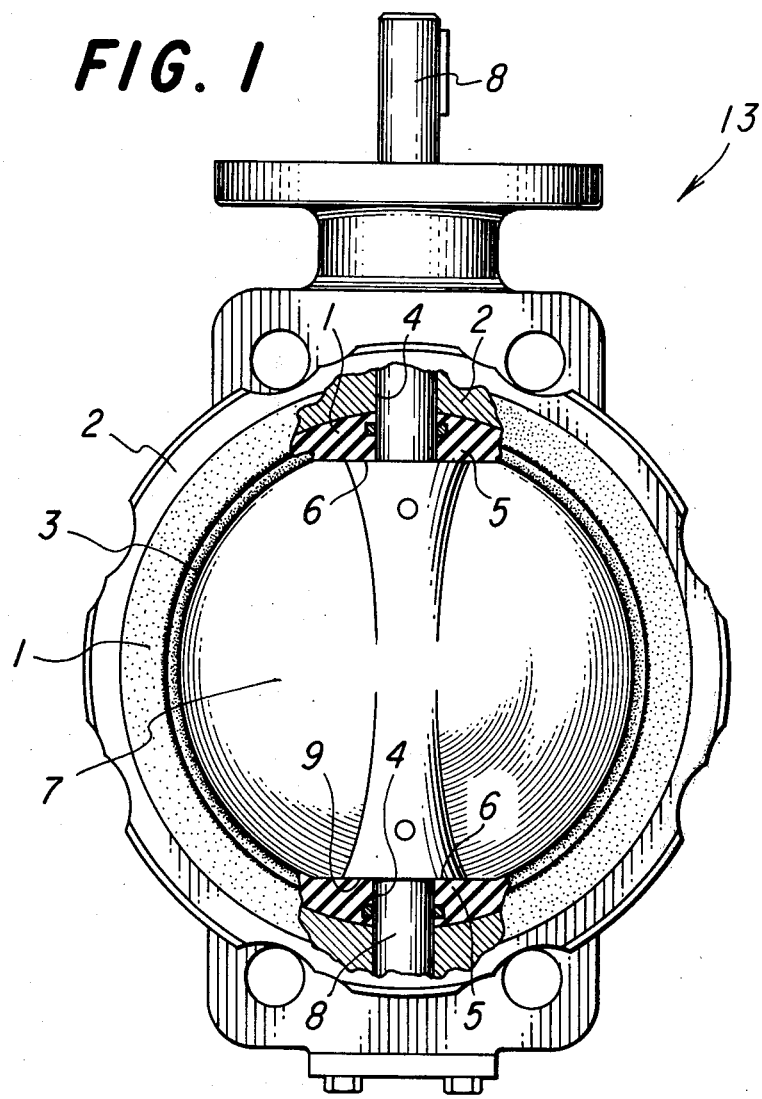
FIG. 1 is a partially sectional view of a butterfly valve of a preferable embodiment according to the present invention.
Figure 2:
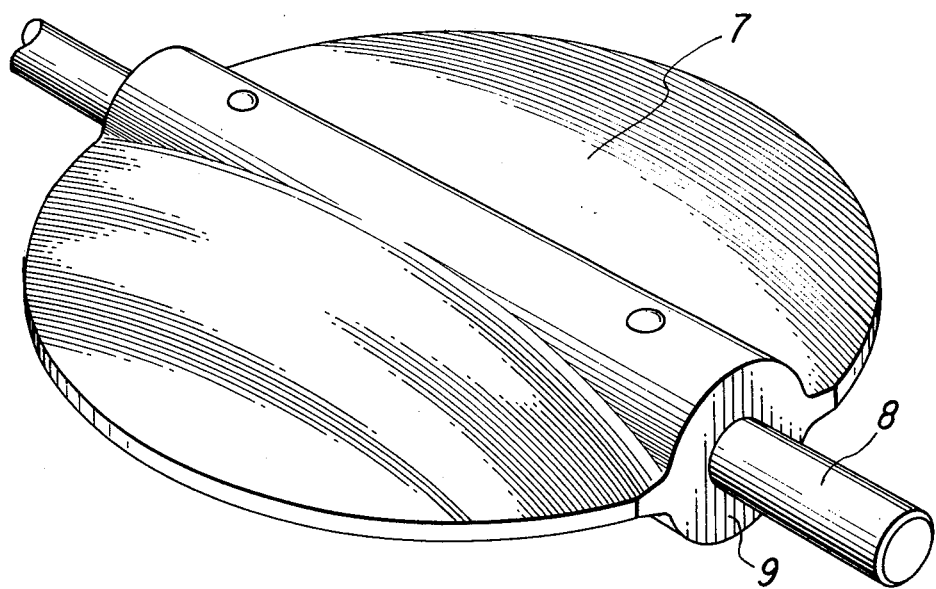
FIG. 2 is an angular perspective view of the valve shown in FIG. 1.
Figure 3:
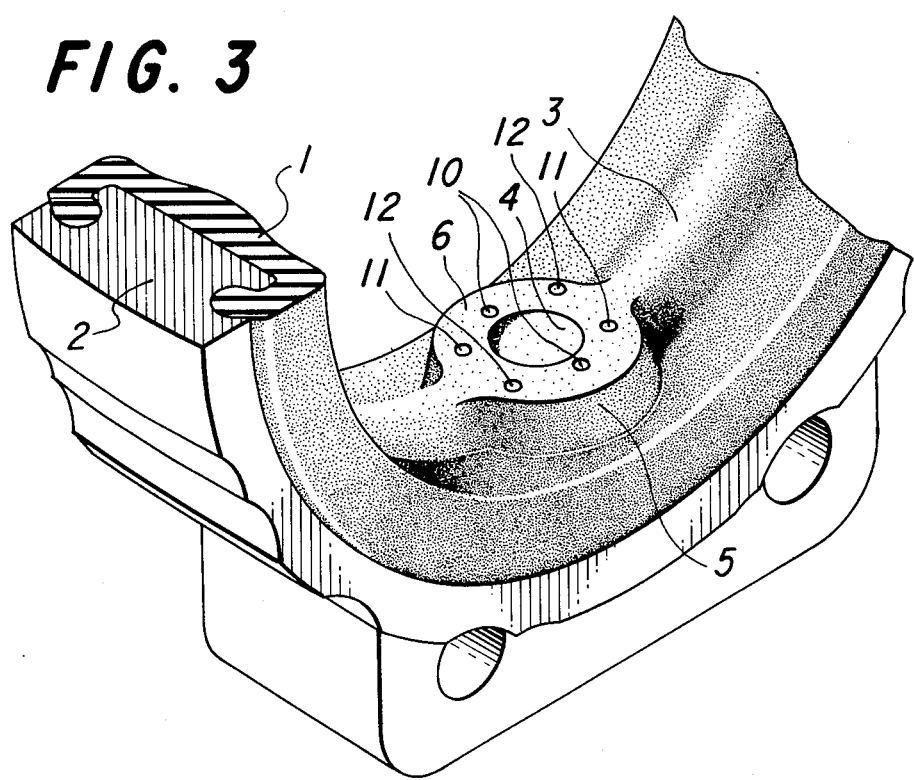
FIG. 3 is a partial angular perspective view of the valve body and the valve seat shown in FIG. 1.
Figure 4:
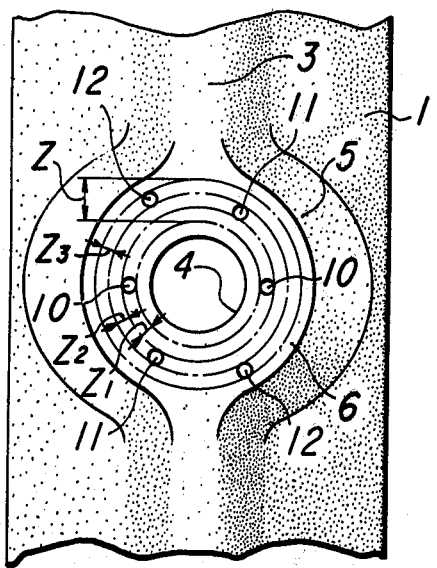
FIG. 4 is a partial plan view of the valve seat shown in FIG. 3.

Referring to FIGS. 1 to 3, the inner and side circumference of the annular valve body 2 of rigid material are covered with a ring-shaped valve seat of elastic material such as rubber and the like. The valve seat 1 is fitted to the valve body 2. A circumferential protrusion 3 is formed along the circumference on the valve seat 1, and opposed each other thereon two annular protrusions 5 connected to said circumferential protrusion 3 and having openings 4 each substantially at its center are formed. Said openings 4 are extending to the valve body 2 through the valve seat 1. The upper face 6 of the annular protrusion 5 is formed substantially flat to act as a sliding face, and a valve stem 8 fixed to the valve member 7 of rigid material is inserted into the opening 4 to function as a bearing for the valve stem 8. An annular sliding face 9 adapted to contact on the upper face 6 of the annular protrusion 5 and to slide in rotating the valve member 7 is formed on the outer face of the disk-shaped valve member 7 in the vicinity of the valve stem 8, and from the substantial center of said sliding face 9 the valve stem 8 is projecting. The sliding face 9 is formed substantially flat corresponding to the upper face 6. The annular zone Z forming substantial sliding face on the upper face 6 may be imaginarily divided into three zones $Z_1$, $Z_2$, and $Z_3$, in each of which a pair of cavities 10, 11, 12 of a small diameter are formed on the annular protrusion 5 to define recesses symmetrically in respect to the port 4. The cavities 10, 11, 12 are preferably formed into the shape of semi-sphere to prevent cracks from occurring.

In assembling a butterfly valve 13 using the valve seat 1, the valve body 2, and the valve member 7 having abovementioned construction, a suitable lubricant such as silicon oil and the like is applied to the flat parts 6, 9, as well as filled in each cavity 10, 11, 12. The butterfly valve 13 equipped with a valve seat 1 thus filled with lubricant can stand long term of employment, because desirable oil film is maintained as a result of gradual exudation of lubricant from the cavities 10, 11, 12 into the flat sliding face 6, 9 to prevent direct contact of the valve seat 1 and the rigid valve member 7. Further, distortion caused in the annular protrusion 5 of the valve seat 1 by rotation of the valve member 7 of rigid material owing to increased friction between the annular sliding face 9 on the side of the valve member 7 and the flat face 6 on the side of the valve seat 1, makes every cavity 10, 11, 12 filled with lubricant to be deformed so as to decrease its volume, resulting in forcing the lubricant into between the sliding face 6, 9 with favorable function of forming oil film. Besides, increase in cost can be substantially avoidable, since conventional metallic dies for fabrication of the valve seat 1 can be used with only a little modification.

For lubricant, beside silicon oil, grease or solid lubricant such as carbon, molybdenum disulfide, and the like can also be used of course.

Figure 5:
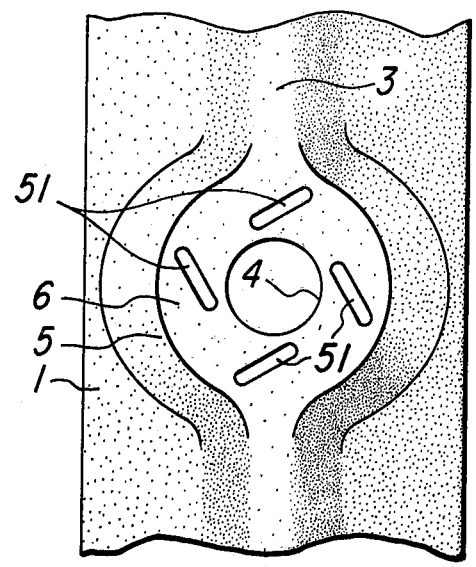
FIGS. 5 to 7 are partial plan views of other embodiments of valve seats according to the present invention.

Now another embodiment of the present invention is described. In FIG. 5, on the upper face 6 of the annular protrusion 5 of the valve seat 1 a plurality of elongated grooves 51 may be formed as recesses radially or with some angles thereto.

Figure 6:
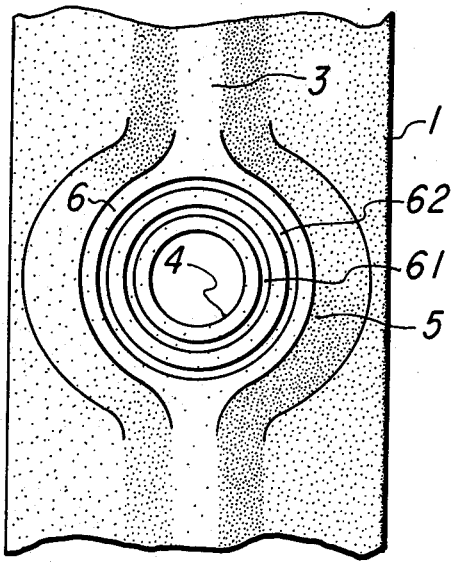

And as shown in FIG. 6, on the upper face 6 of the annular protrusion 5 of the valve seat 1, for example, two annular narrow grooves 61, 62 may be formed as recesses with lubricant being filled in said grooves 61, 62.

Figure 7:
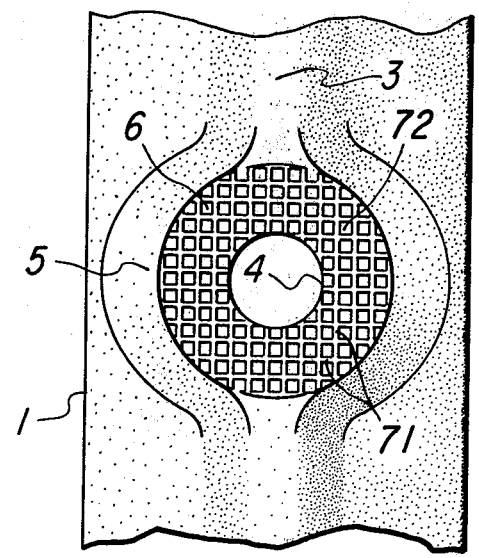
Figure 8:
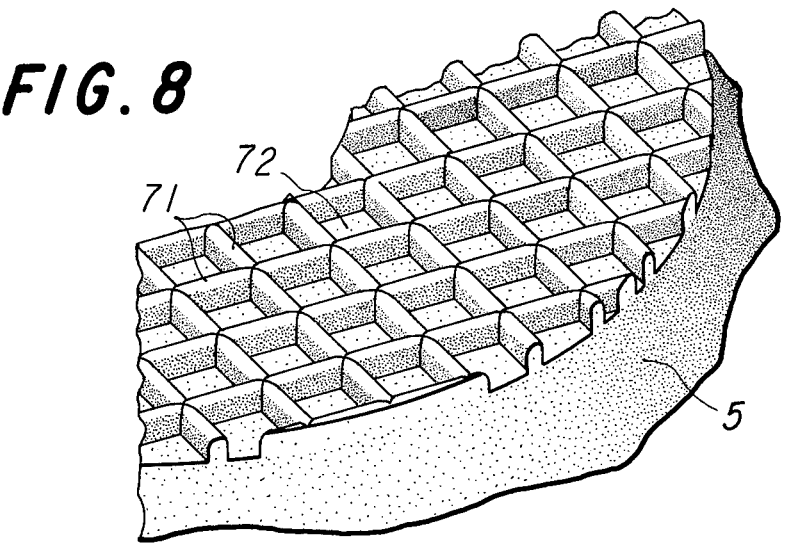
FIG. 8 is a particular detailed view of the sliding face of the valve seat shown in FIG. 7.

Furthermore, referring to FIGS. 7 and 8, on the upper face 6 of the annular protrusion 5 of the valve seat 1, latticed protrusions 71 may be formed to define a number of minute recesses 72 surrounded by said latticed protrusions 71 with lubricant filled in the recesses 72. In employing such a valve seat 1 having latticed protrusions 71 on the annular protrusion 5, some deformation of the latticed protrusions 71 by pressing said latticed protrusions 71 on the annular sliding face 9 of the valve member 7 affects the anti-leakage action against fluid more effectively, and in addition preferable lubricating function is provided by gradual exudation of lubricant from recesses 72 into the sliding faces 6, 9.

In this case, said latticed protrusions 71 may be formed integrally of the valve seat 1, or it is also possible to be formed by making a sheet of reticular gasket cut into a desirable configuration to stick to the upper face 6 of the annular protrusion 5.

Figure 9:
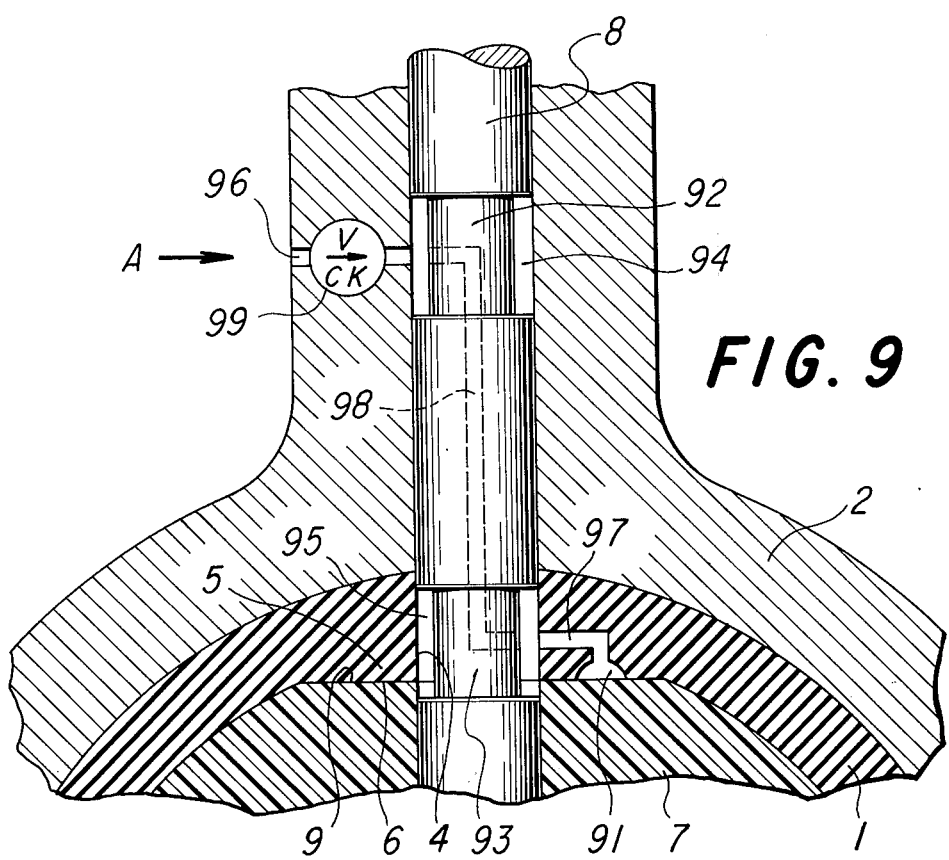
FIG. 9 is a partial sectional view of the butterfly valve shown in FIG. 1 equipped with lubricant supplying means.

Still more, referring to FIG. 9, a recess 91 may be formed on the upper face 6 of the annular protrusion 5 of the valve seat 1, lubricant being able to be supplied to said recess 91 from outside in case of necessity. Namely, in FIG. 9, it may be adapted that the valve stem 8 of the valve member 7 is formed to have portions of smaller diameter 92, 93, an annular chamber 94 is defined by the valve body 2 and the valve stem 8, an annular chamber 95 is defined by the valve seat 1, the valve member 7 and the valve stem 8, a bore 96 communicating the annular chamber 94 with outside of the valve body 2 is drilled in the valve body 2, at the same time a bore 97 communicating the annular chamber 95 with the recess 91 is drilled in the valve seat 1, and a similar communicating bore 98 is drilled in the valve stem 8 in order to communicate the annular chamber 94, 95, and a bore 96 is equipped with a check valve 99 to inject lubricant through the bore 96 as the allow A in case of necessity, said lubricant being introduced into the annular chamber 94 through the check valve 99, into the annular chamber 95 through the communicating bore 98, and into the recess 91 through the bore 97. Accordingly, lubricant supplied and charged to the recess 91 is fed between the sliding faces 6 and 9 to provide a desirable lubricating function.

In every embodiment above-mentioned, the recesses for charging lubricant are preferably equipped all over the zone Z to form oil film uniformly at least on the whole surface of the principal sliding zone Z.

In above-mentioned embodiments, recesses are formed on the side of the valve seat 1, however, alternatively recesses for filling lubricant may be in all the same manner formed on the sliding face 9 of the valve member 7.

What is claimed is:

1. A butterfly valve comprising an annular valve body,
a ring-shaped elastic valve seat fitted to an inner circumference of the valve body, said valve seat having diametrically opposed openings, an annular sliding face around each of the openings and at least a pair of recesses charged with lubricant on each sliding face, said pair of recesses being disposed symmetrically with respect to the respective opening of the valve seat,
a valve stem pivotally fitted to the valve body through the openings of the valve seat, and
a valve disk fitted to the valve stem, said valve disk having a pair of annular sliding faces around the valve stem, each sliding face of the valve disk slidably contacting a respective corresponding sliding face of the valve seat during rotation of the valve disk.

2. A butterfly valve as claimed in claim 1, wherein each of said recesses has a semi-spherical profile.

3. A butterfly valve as claimed in claim 2, wherein the sliding face of the valve seat is divided into annular zones in each of which at least a pair of the recesses are disposed symmetrically with respect to the opening of the valve seat.

4. A butterfly valve as claimed in claim 1, wherein each of said recesses has the shape of an elongated groove extending radially from the vicinity of the opening of the valve seat.

5. A butterfly valve as claimed in claim 1, wherein each of said recesses has the shape of an annular groove disposed concentrically with the opening of the valve seat.

6. A butterfly valve as claimed in claim 1, wherein each of the recesses is surrounded with a latticed protrusion.

7. A butterfly valve as claimed in any one of claims 1 to 6, further comprising lubricant supplying means for supplying lubricant from the exterior of the butterfly valve to said recesses, said lubricant supplying means having a bore formed in the valve body with one end open to the exterior of the butterfly valve, an annular chamber formed around the stem and communicating with said bore, and another bore communicating said annular chamber with said recesses.

8. A butterfly valve as claimed in claim 7, wherein said lubricant supplying means further comprises a check valve provided at said bore of the valve body to prevent a counter flow of the lubricant from said bore to the exterior of the butterfly valve.

9. A butterfly valve as claimed in claim 1, wherein said valve seat has plural pairs of recesses including said pair of recesses, for charging with lubricant, on each sliding face, each sliding face of the valve seat is divided into annular zones in each of which each of said plural pairs of the recesses are disposed symmetrically with respect to the opening of the valve seat in each zone.

10. A butterfly valve comprising,
an annular valve body,
a ring-shaped elastic valve seat fitted to an inner circumference of the valve body, said valve seat having diametrically opposed annular protrusions, each of which is formed with an opening at the center thereof, an upper face of each said protrusion defining an annular flat sliding face with at least a pair of recesses for charging with lubricant, each said pair of recesses being disposed symmetrically with respect to a respective opening of the valve seat,
a valve stem pivotally fitted to the valve body through the openings of the valve seat, and
a rigid valve disk fitted to the valve stem, said valve disk having a pair of annular flat sliding faces around the valve stem corresponding to the sliding face of the valve seat, each sliding face of the valve disk slidably contacting a respective corresponding sliding face of the valve seat during rotation of the valve disk.

11. A butterfly valve as claimed in claim 10, wherein each of said recesses has a semi-spherical profile.

12. A butterfly valve as claimed in claim 11, wherein the sliding face of the valve seat is divided into annular zones in each of which at least a pair of the recesses are disposed symmetrically with respect to the opening of the valve seat.

13. A butterfly valve as claimed in claim 10, wherein each of said recesses has the shape of an elongated groove extending radially from the vicinity of the opening of the valve seat.

14. A butterfly valve as claimed in claim 10, wherein each of said recesses has the shape of an annular groove disposed concentrically with the opening of the valve seat.

15. A butterfly valve as claimed in claim 10, wherein each of the recesses is surrounded with a latticed protrusion.

16. A butterfly valve as claimed in any one of claims 10 to 15, further comprising lubricant supplying means for supplying lubricant from the exterior of the butterfly valve to said recesses, said lubricant supplying means having a bore formed in the valve body with one end open to the exterior of the butterfly valve, an annular chamber formed around the stem and communicating with said bore, and another bore communicating said annular chamber with said recesses.

17. A butterfly valve as claimed in claim 16, wherein said lubricant supplying means further comprises a check valve of the lubricant from said bore to the exterior of the butterfly valve.

18. A butterfly valve as claimed in claim 10, wherein each annular sliding face is provided with plural pairs of recesses including said pair of recesses, for charging with lubricant, and each said annular sliding face is divided into annular zones in each of which each of said plural pairs of the recesses are disposed symmetrically with respect to each opening of the valve seat respectively.

19. A butterfly valve comprising
an annular valve body,
a ring-shaped elastic valve seat fitted to an inner circumference of the valve body, said valve seat having diametrically opposed openings, an annular flat sliding face around each of the openings and cavities charged with lubricant on the sliding face, each of said cavities having a semi-spherical profile, at least a pair of the cavities disposed symmetrically in respect to each respective opening of the valve seat in each of concentrical annular zones with the opening, dividing imaginarily each sliding face of the valve seat,
a valve stem pivotally fitted to the valve body through the openings of the valve seat, and
a rigid valve disk fitted to the valve stem, said valve disk having a pair of annular flat sliding faces around the valve stem, each sliding face of the valve disk slidably contacting a respective corresponding sliding face of the valve seat during rotation of the valve disk.

20. A butterfly valve as claimed in claim 19, further comprising lubricant supplying means for supplying lubricant from the exterior of the butterfly valve to said cavities, said lubricant supplying means having a bore formed in the valve body with one end open to the exterior of the butterfly valve, an annular chamber formed around the stem and communicating with said bore, and another bore communicating said annular chamber with said cavities.

21. A butterfly valve as claimed in claim 20, wherein said lubricant supplying means further comprises a check valve provided at said bore of the valve body to prevent a counter flow of the lubricant from said bore to the exterior of the butterfly valve.

* * * * *